United States Patent [19]
Hammond

[11] 3,785,159
[45] Jan. 15, 1974

[54] ATTENUATION OF WATER WAVES AND CONTROL AND UTILIZATION OF WAVE-INDUCED WATER MOVEMENTS

[75] Inventor: Douglas L. Hammond, San Carlos, Calif.

[73] Assignee: FMC Corporation, San Jose, Calif.

[22] Filed: Nov. 21, 1972

[21] Appl. No.: 308,368

Related U.S. Application Data

[63] Continuation-in-part of Ser. No. 113,521, Feb. 8, 1971, abandoned.

[52] U.S. Cl. ................................ 61/5, 61/1 F, 61/2, 210/242
[51] Int. Cl. ........................ E02b 3/06, E02b 15/04
[58] Field of Search ...................... 61/5, 1, 2, 3, 4, 61/20; 210/242; 114/125

[56] References Cited
UNITED STATES PATENTS

| | | | |
|---|---|---|---|
| 3,595,026 | 7/1971 | Scholl | 61/5 |
| 3,489,396 | 1/1970 | D'Aragon | 61/25 X |
| 3,222,871 | 12/1965 | Miller et al. | 61/5 |
| 2,658,350 | 11/1953 | Magill | 61/5 |

*Primary Examiner*—Jacob Shapiro
*Attorney*—F. W. Anderson et al.

[57] ABSTRACT

Curved vane-like structures for positioning beneath or at the surface of a body of water to attenuate incident waves, and change the wave-induced normal orbital water movements to produce currents and other useful hydrodynamic effects or combinations thereof. The vanes in the structures are configured and oriented to intercept the water at various locations in its orbital movements, guide it into new paths defined by the shape of the vanes, and discharge it from the structure as a current flowing in a preselected direction, such as counter to or in the direction of wave movement, towards the water surface, or towards the bottom or floor of the body of water. These effects are utilized to perform useful work, including diminishing wave height, speed and period, moving subsurface and surface debris and contaminants such as spilled oil to a collecting point or facility, transportation and dispersal of waters polluted by thermal, chemical or other discharges, transfer of sand, silt, or other solid material on the bottom from one location to another, and generation of electrical or hydraulic power. Various styles and configurations of these vaned structures, manners in which they can be arranged to perform an intended function, and methods for securing them in operating position also are described.

33 Claims, 31 Drawing Figures

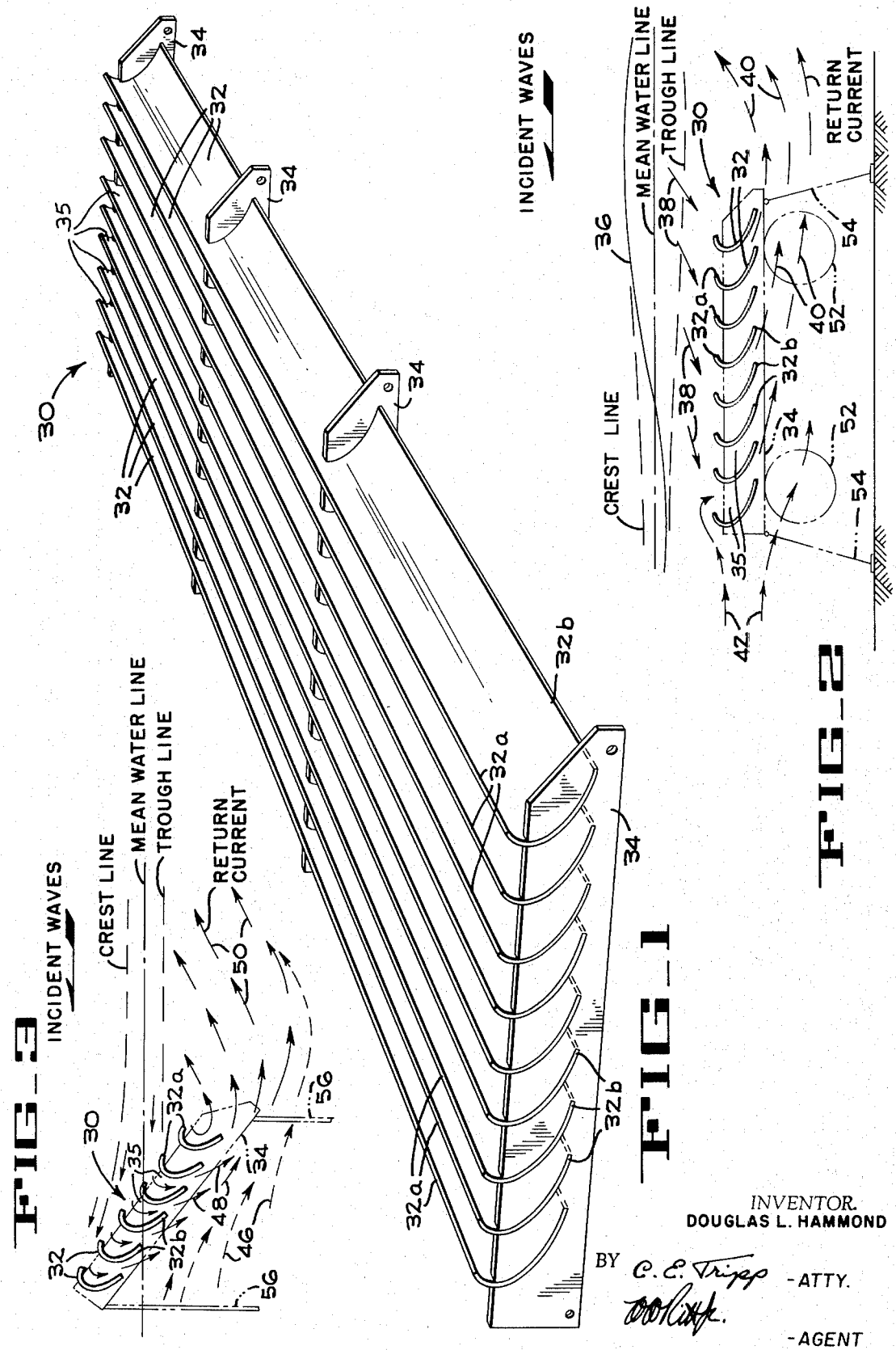

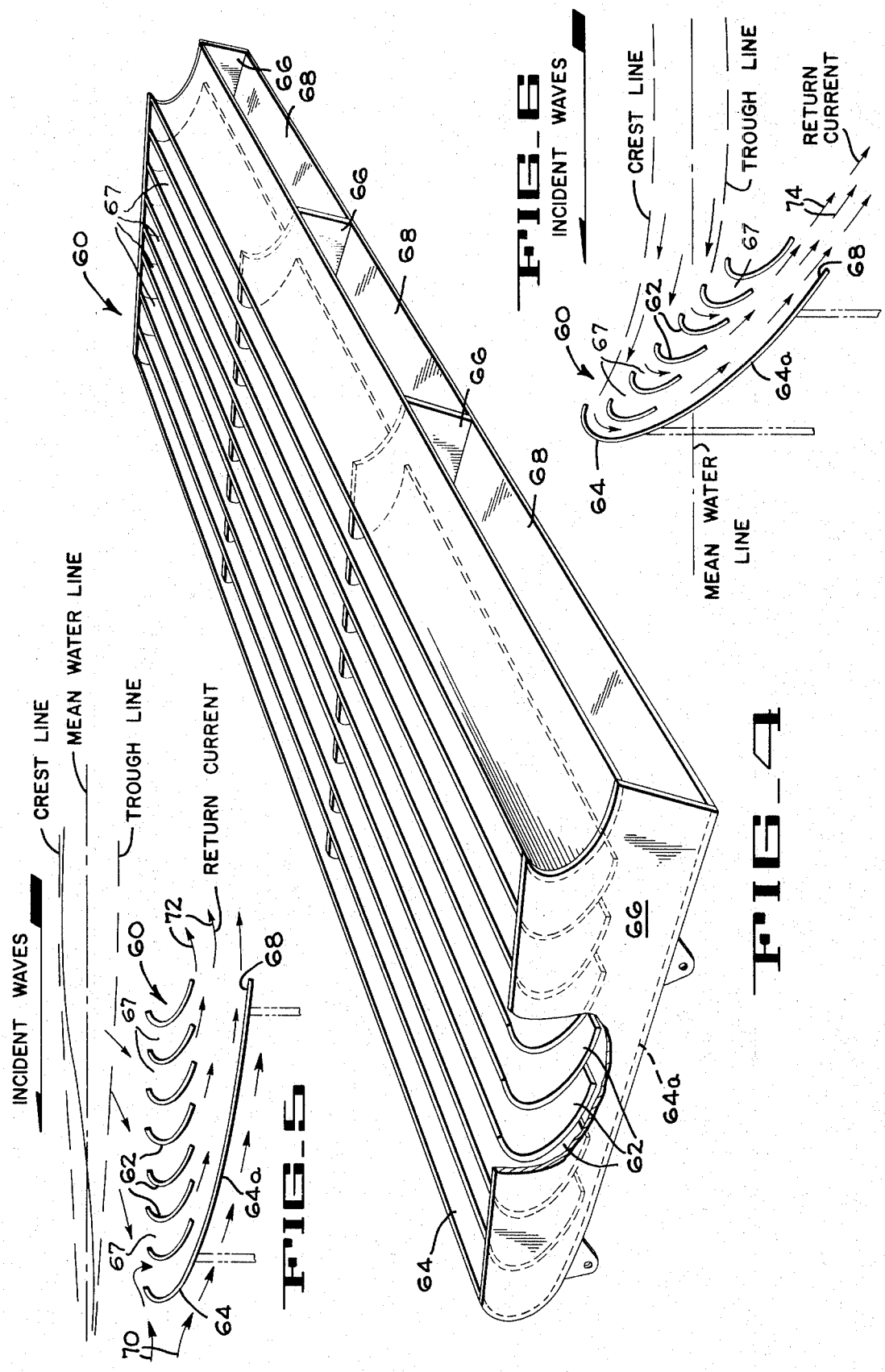

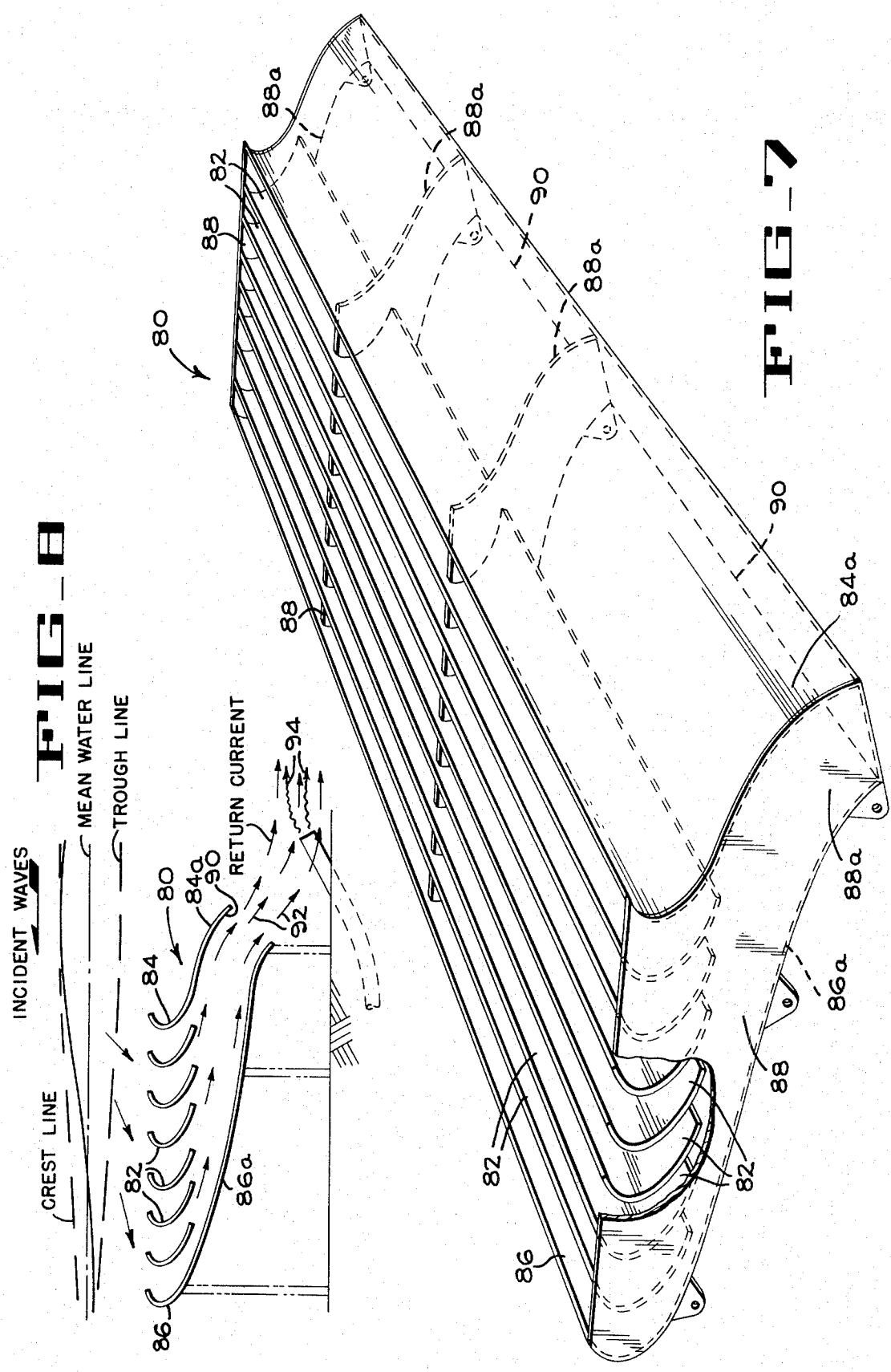

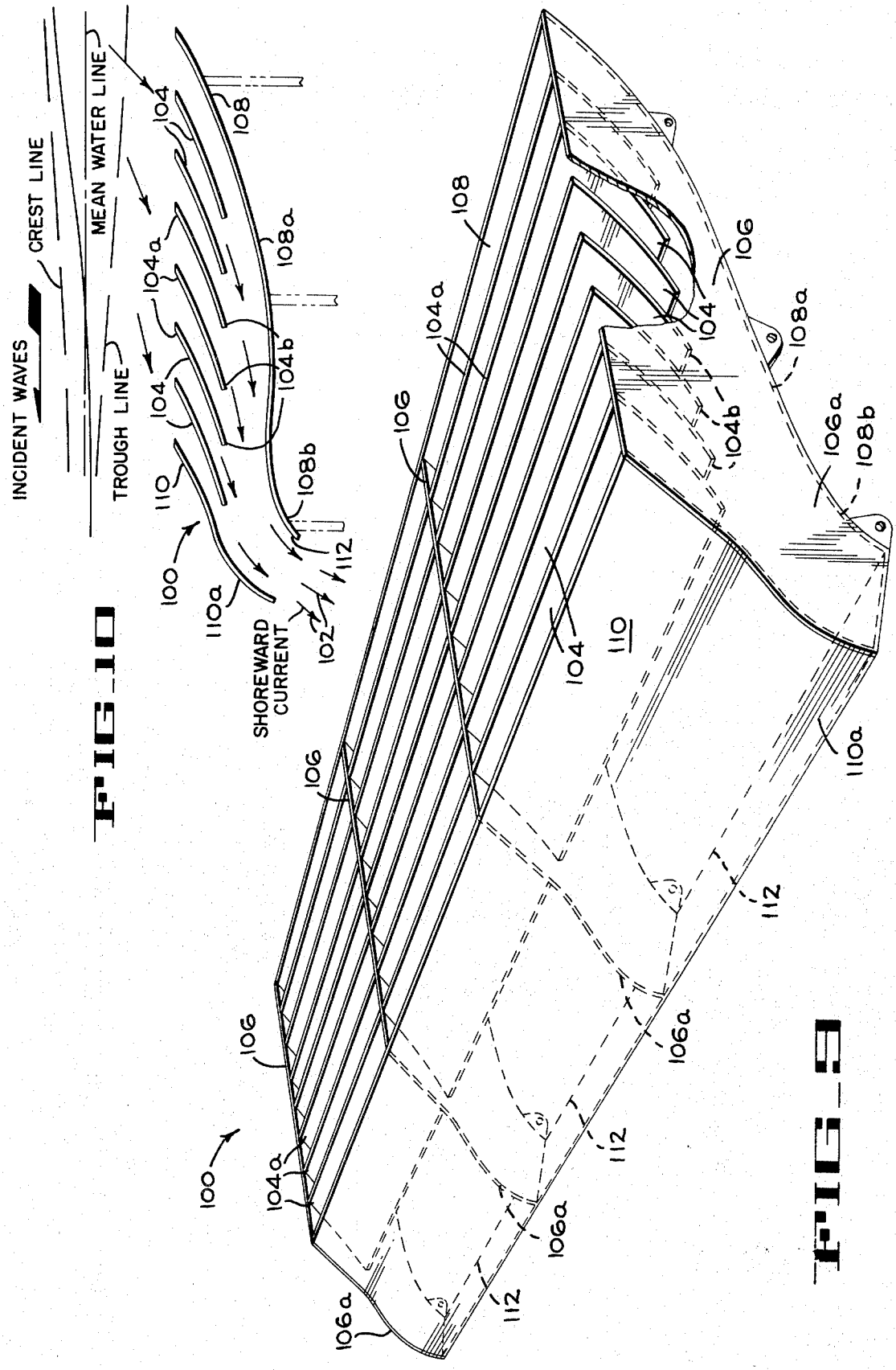

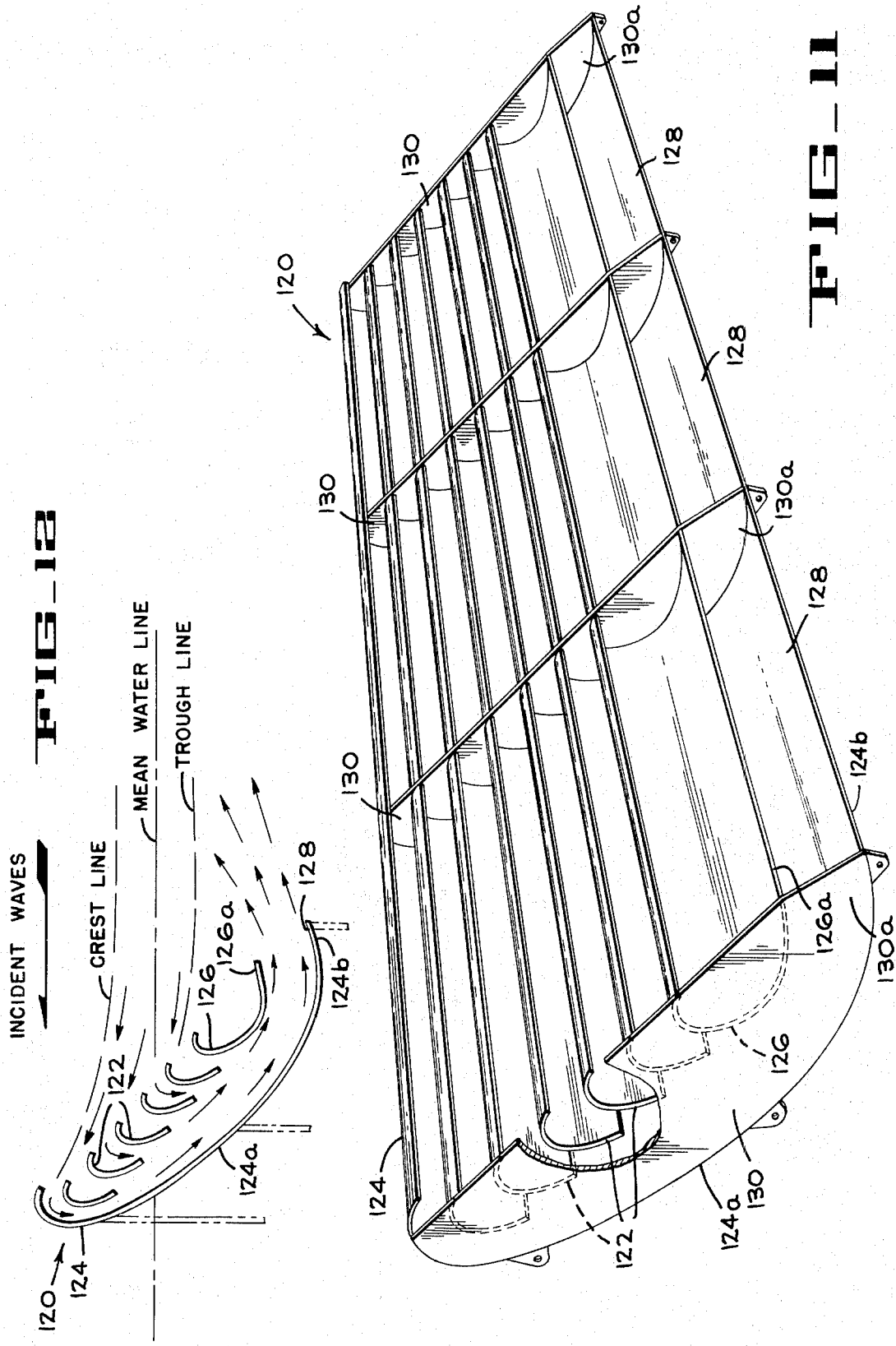

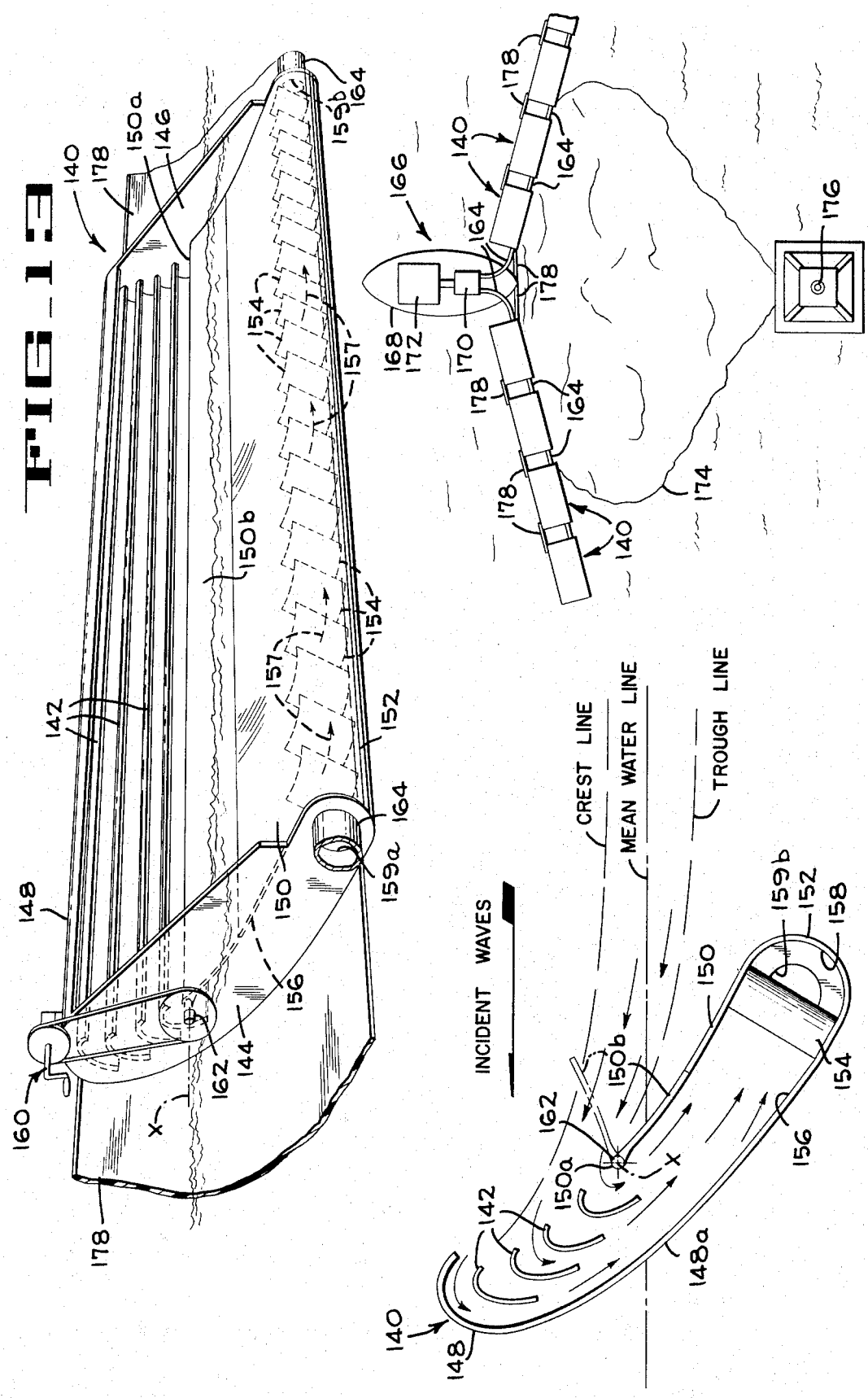

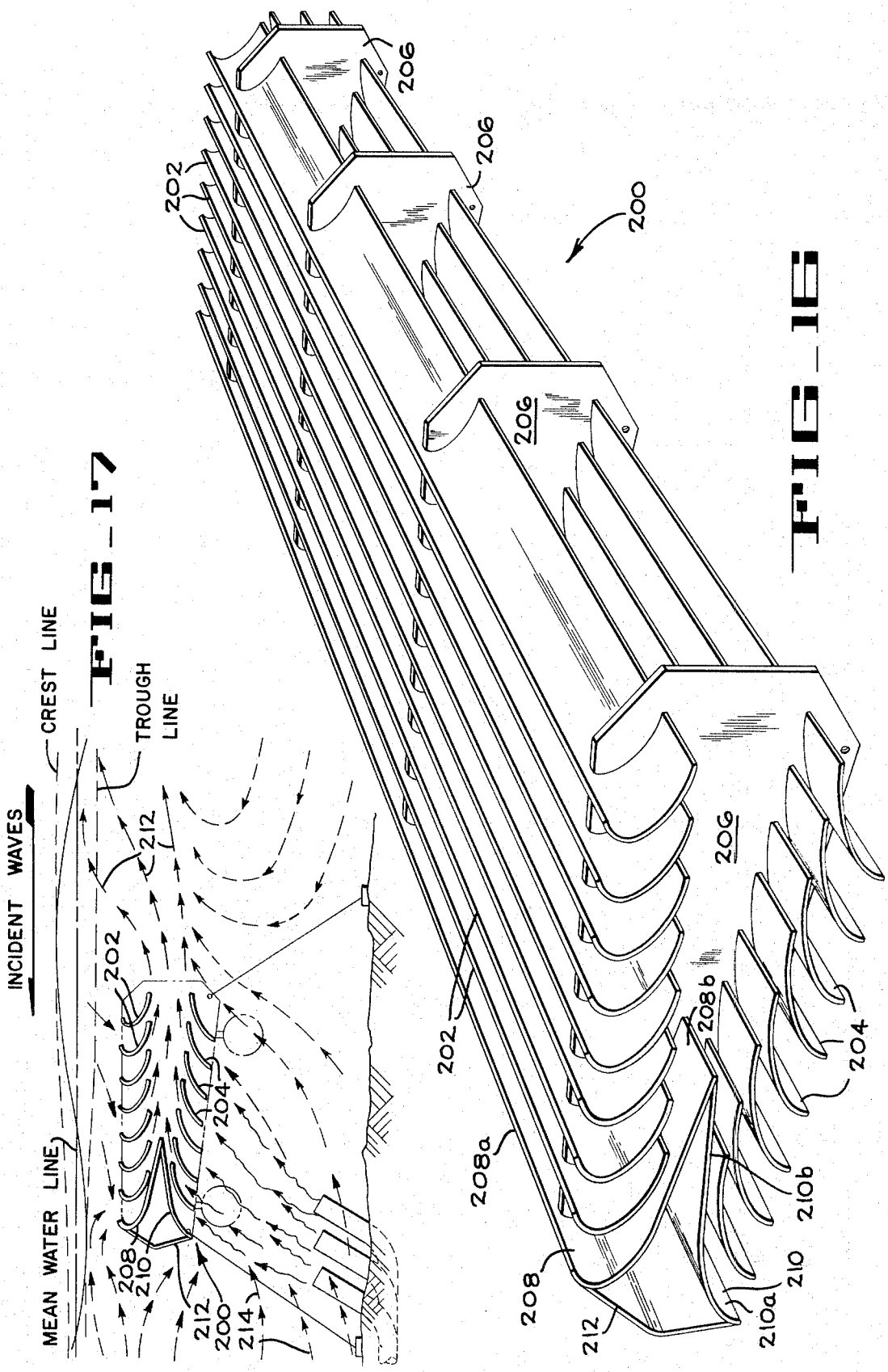

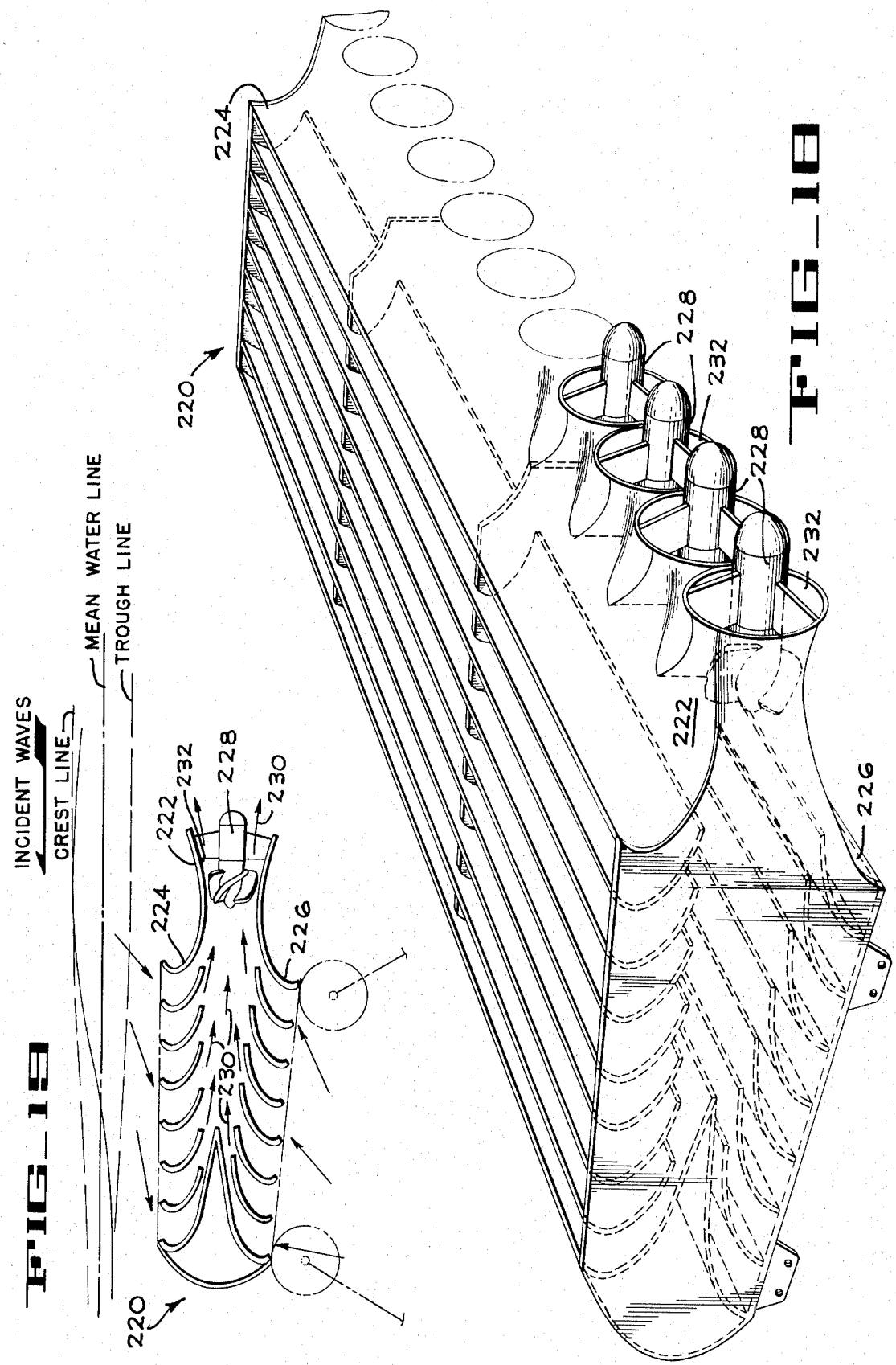

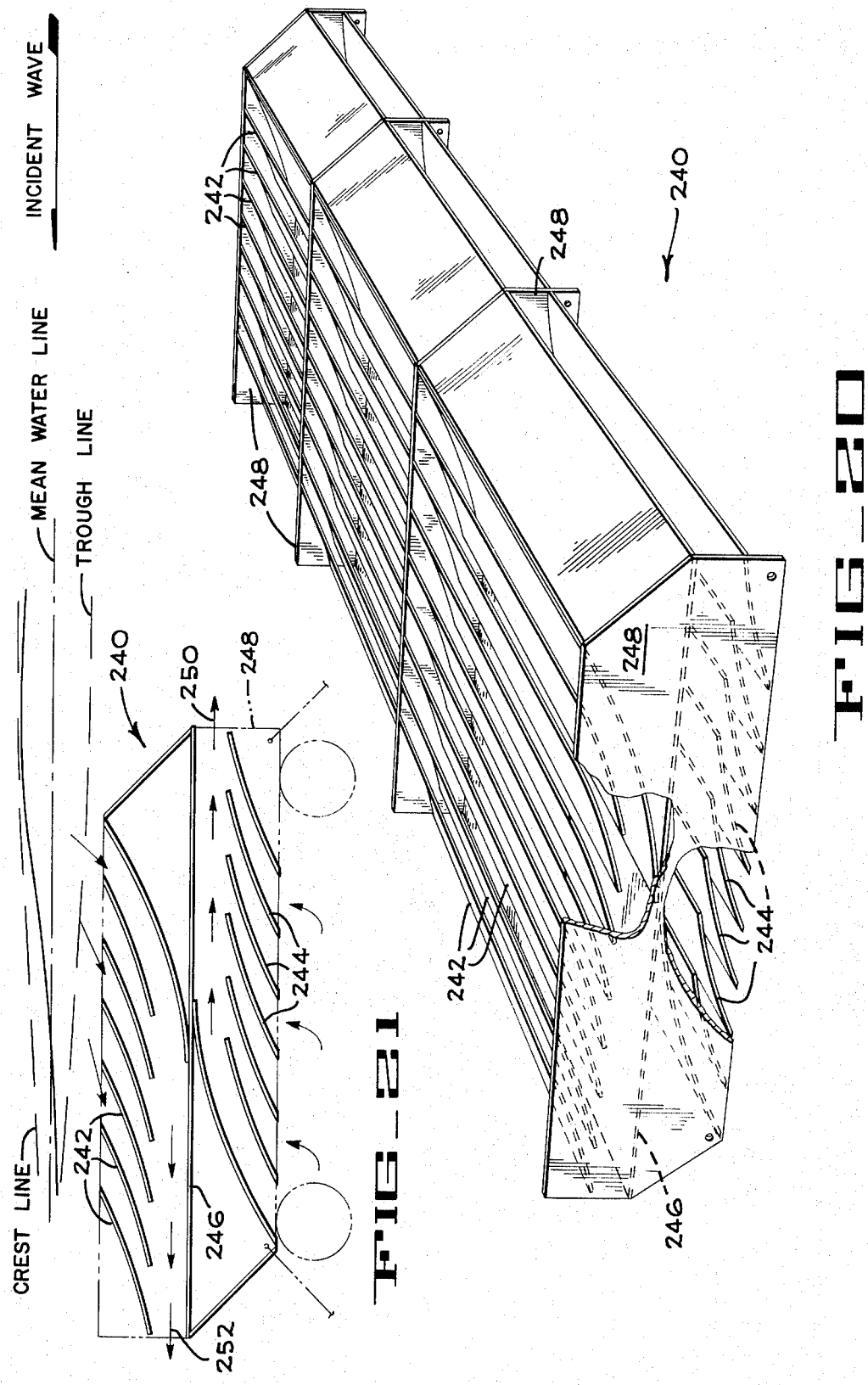

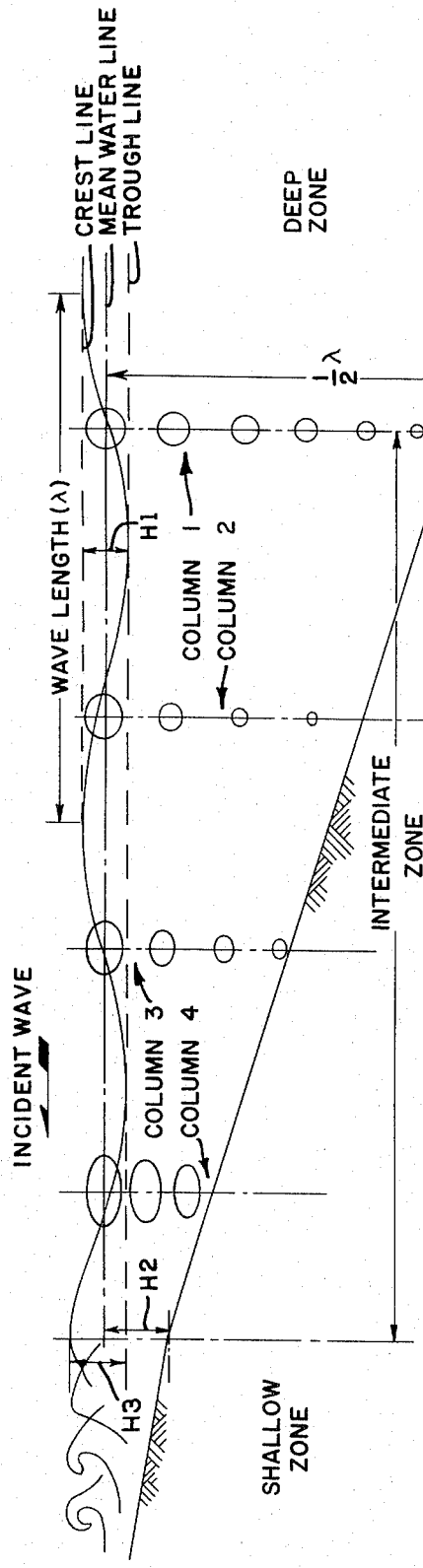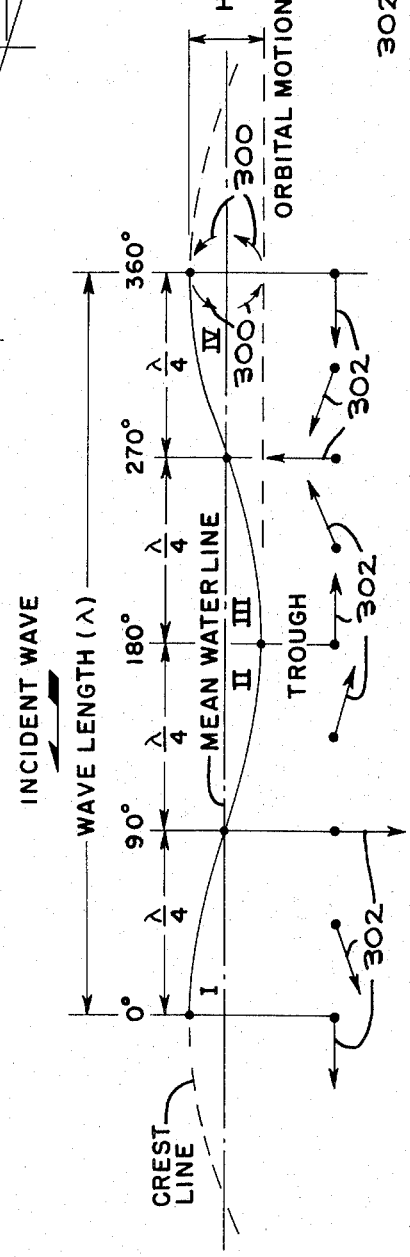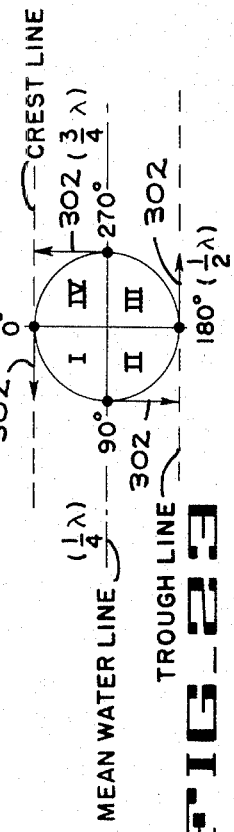

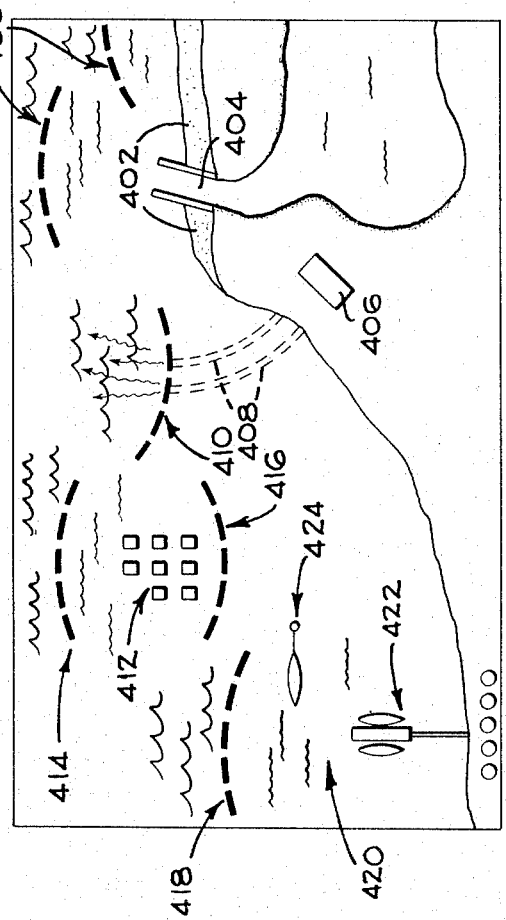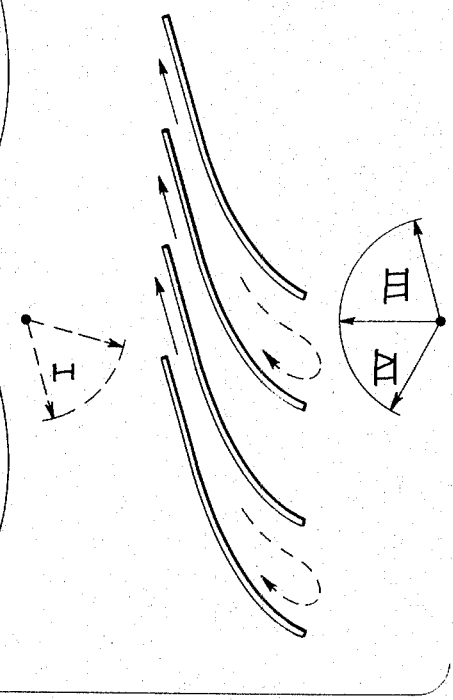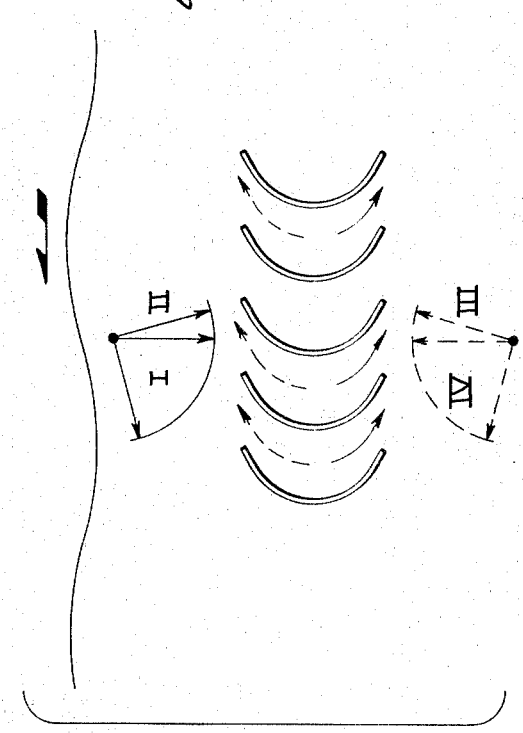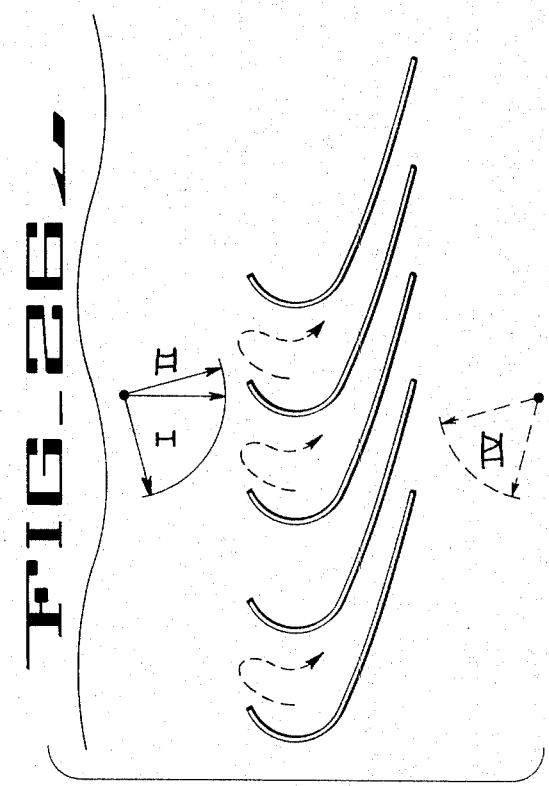

ATTENUATION OF WATER WAVES AND CONTROL AND UTILIZATION OF WAVE-INDUCED WATER MOVEMENTS

CROSS REFERENCE TO RELATED APPLICATION

This application is a continuation-in-part of my copending application Ser. No. 113,521, filed Feb. 8, 1971 and now abandoned.

BACKGROUND OF THE INVENTION

This invention relates to the attenuation of water waves, and to the control and utilization of wave-induced water movements. More particularly, this invention relates to vane-like structures that are positioned at or beneath the water surface in the path of such waves to diminish their height, speed and period, and to structures for altering natural wave-induced water movements to selectively produce various types of hydrodynamic-reactive phenomena that may be employed to perform useful work, such as containing and collecting oil spillage, dispersing waters polluted by thermal, chemical, or sewage discharges, and generating electrical or hydraulic power.

As is abundantly shown by the prior art, a wide variety of breakwaters and related devices have been proposed for attenuating the heights of waves in the ocean and other bodies of water to establish a relatively calm area for the protection of beaches and shoreline installations, small boat harbors, ship anchorages, harbor and river entrances and channels, and offshore dredging, mining, and oil and gas drilling and production operations and installations. The forces exerted by large waves can be huge, often of sufficient magnitude to severely damage and even destroy these protective structures, and much investigation by many noted authorities has been directed towards a better understanding of a wave's composition and how its forces can be controlled. As a result, it is now known that most water waves arise from wind induced deformations imposed upon the surface of this highly plastic but essentially stationary fluid, and this action by the wind creates a train of undulations which travel in the wind's direction. Below the surface, however, the body of water itself simply yields locally in a generally circular orbital path, centered about a relatively stationary reference axis. Neglecting the possible presence of currents, which are not related to this phenomenon, deep water waves do not cause or require any net fluid transport.

Accordingly, from the first attempts to combat these forces with mounds of rubble or other solid material resting on the ocean floor and extending above the waters's surface, efforts in this field have evolved into complex devices with intricately associated moving parts to adjust to wave sizes and patterns. Although the literature is replete with examples of these attempts to overcome these problems, few have been found sufficiently successful to warrant their use, and so far as is known none has been completely satisfactory from every aspect, including strength, initial cost, maintenance, and versatility.

Another related problem is that of pollution of bodies of water by contaminants discharged into the water from various sources, such as sewage effluent, hot waste water and other liquids from steam or atomic power generating plants, petroleum refineries, chemical plants, etc., crude oil from offshore oil wells and tankers, and garbage discharged from the ever-increasing fleet of ships and pleasure craft. These highly undesirable occurrences have been the cause for grave concern throughout the world, particularly in densely populated areas adjacent to beaches, harbors, and other ocean fronting locations, and other bodies of water where pollution occurs, and where these pollutants tend to collect and remain because of natural wave activities and currents flowing towards these locations. In view of the improbability of achieving a total cessation of these practices, much effort has been, and is being, exerted towards development of methods and devices for containing and collecting the floating contaminants and for dispersing the others. As yet, however, none of the known systems or procedures is entirely satisfactory.

Still another problem associated with the waves and currents in bodies of water is that of the undesirable erosion and coastwise movement of beach sands (littoral transport), especially during the stormier winter months. This problem not only results in the depletion or loss of natural beaches but also contributes heavily to the buildup of sand and other bottom sediments in channels, along jetties, and the like.

A further problem associated with the waves and currents in bodies of water is that of undesirable buildup of sand and other bottom sediments in channels, harbors, and along jetties protecting the entrances to these areas. The traditional way of handling this problem is to periodically dredge out the obstructing material, a costly and time consuming operation, yet one which is necessary if navigation is to be maintained. This problem becomes especially troublesome and expensive where dredging operations must be carried on practically continuously because of constant, adverse currents that cause migration of bottom material.

SUMMARY OF THE INVENTION

Broadly considered, the present invention involves the employment of a series of curved vaned-like structures placed across the path of incident waves to reduce their height, speed and period, and to change the wave-induced water movements from their natural course to create water currents and other useful hydrodynamic effects such as artificial shoaling, partial phase-inversion momentum cancellation, mass transport diversion, wave reflections, and combinations thereof. These structures comprise a plurality of rigid, curved vanes spaced apart in a manner somewhat resembling a grating, and they are positioned either horizontally beneath the mean water line or sloping upwardly at an angle with the upper portion exposed above the water's surface.

With respect to the first or subsurface position, the combined hydrodynamic effects of this vaned structure cause a significant reduction in the height, speed and period of the incident waves passing over it, and also the wave-induced water movements are diverted from their natural orbital course into a relatively straight current whose direction is governed by the vane's curvature and attitude where this current emanates from the structure. The second or surface position of the curved vanes presents a dynamically active barrier to the incident waves and produces substantially total calm water on the lee side, while the sub-surface water movement is reoriented into a current of the same general nature as that from the totally submerged structure.

The curved vanes can be arranged in a variety of manners for producing different degrees of wave attenuation, direction and magnitude of current, and ultimate function or purpose for which the structure is employed. For example, a single array of suitably curved vanes, i.e., a plurality of vanes arranged like a grating, can be utilized both as a breakwater and as a diverter of the wave-induced water movements, and dual arrays are very successful in producing a strong current from the forces collectively present. The currents produced by the structures of this invention are useful for many purposes including, but not limited to, the dispersal of waters polluted by chemical, thermal, sewage, etc., discharges, relocation of bottom material to open and maintain navigation channels and to convey beach replenishment sand from point to point, and even generation of electric or hydraulic power. In addition to their breakwater function, surface-positioned structures of this invention also can be utilized as a dynamic barrier against spread of floating contaminants such as oil, solid debris, etc., and one form of such barrier-structure also employs wave energy to pump the captured contaminant to a collection point.

The size of the structures of this invention can be varied to suit particular needs. The length of the average wave expected to be most frequently encountered has been found to be a very satisfactory guideline for the structure's size. For example, for use in "design waves" of 200 feet a structure with a width of 50 feet, a height of 10 feet, and a length parallel to the incident waves of any desired dimension would be very effective.

The invention includes not only single structures or units, but also the employment of a plurality of units linked together in an end-to-end configuration to provide an extensive and continuous installation of any desired length, to achieve the desired effects. The structures of this invention can be supported by pilings driven into the floor of the body of water, by jack-up legs, or by buoyant tanks or other suitable flotation means in conjunction with standard mooring provisions.

Accordingly, one object of this invention is the provision of a new type of device for significantly reducing the height, speed, and period of incident waves in a body of water, and to redirect the forces exerted by these waves into beneficial tasks.

Another object of this invention is the provision of a device for redirecting natural wave-induced water movements to produce various unique hydrodynamic reactions for accomplishing useful purposes, including the production of currents to disperse chemical, thermal, sewage, etc. effluents, and the containment and collection of oil spills and other floating contaminants.

Yet another object of this invention is to facilitate the use of waves and wave-induced water movements to power propeller-driven generators, pumps, etc., for providing electric or hydraulic forms of energy.

A further object of this invention is to provide structures for the foregoing that are portable, durable, relatively easy to manufacture and modest in cost, that can be positioned in substantially any water depth where their utility is desired, and that can be used to construct a wide variety of temporary or permanent installations.

Still another object of the invention is to provide structures, for the foregoing purposes, that exhibit great immunity to adverse environmental factors such as variations in water level, abnormal waves, and aquatic flora and fauna.

BRIEF DESCRIPTION OF THE DRAWINGS

FIG. 1 is a view in perspective of a fundamental type of structure according to this invention, comprising a single array of curved vanes rigidly secured in spaced relationship by a plurality of transverse braces.

FIG. 2 is a diagrammatic side elevation of the structure of FIG. 1, showing it positioned in a subsurface location to diminish the height and intensity of incident waves and generate a moderate and relatively shallow offshore current.

FIG. 3 is a view like FIG. 2, but depicting the structure of FIG. 1 positioned as a breakwater at the surface to greatly attenuate incident waves and generate a current flowing counter to these waves.

FIG. 4 is a view in perspective of a modified version of the curved vane device of FIGS. 1–3, wherein the last vane is continued forward beneath the other vanes to conduct the water flowing from between the vanes to a forward-facing exit.

FIG. 5 is a view like FIG. 2, illustrating a subsurface installation of the structure of FIG. 4.

FIG. 6 is a view like FIG. 3, illustrating a surface installation of the structure of FIG. 4.

FIG. 7 is a view in perspective of a slightly modified version of the structure of FIG. 4, this version designed for subsurface use and having its water exit portion elongated and curved to direct the return current downwardly.

FIG. 8 is a view like FIG. 5, illustrating a subsurface installation of the structure of FIG. 7.

FIG. 9 is a view in perspective of a modified version of the structure of FIG. 7, this version also designed for subsurface use but oriented in the direction opposite that of the device of FIG. 7.

FIG. 10 is a diagrammatic side elevation of the structure of FIG. 9, positioned in a subsurface location.

FIG. 11 is a view in perspective of another modified version of the structure of FIG. 4, this version having its exit portion curved to produce an upwardly oriented return current when the device is installed in its surface location.

FIG. 12 is a diagrammatic side elevation of the structure of FIG. 11, positioned in its surface location.

FIG. 13 is a view in perspective of another structure embodying the principles of this invention, this structure designed for use at the surface to contain and collect oil spillage and pump it into a receiver, such as a ship or barge.

FIG. 14 is a diagrammatic side elevation of the structure of FIG. 13, positioned in a surface location.

FIG. 15 is a diagrammatic plan view showing a series of the structures of FIG. 13 connected together and to a receiving barge for collecting an oil spill.

FIG. 16 is a view in perspective of yet another embodiment of the present invention, this structure involving a dual array of curved vanes for generating a relatively strong return current.

FIG. 17 is a view in side elevation diagrammatically illustrating a subsurface installation of the structure of FIG. 16.

FIG. 18 is a view in perspective of a modified version of the structure of FIG. 16, wherein the exit portion is provided with a plurality of exit ports in which are mounted propeller driven power generators.

FIG. 19 is a diagrammatic side elevation of the structure of FIG. 18, positioned in a subsurface location.

FIG. 20 is a view in perspective of another dual array version of the present invention, this version designed to produce two oppositely directed currents.

FIG. 21 is a diagrammatic side elevation of the structure of FIG. 20, positioned in a subsurface location.

FIG. 22 is a diagrammatic representation of a vertical section through a body of water with waves, illustrating the patterns at various depths of the wave-induced orbital water movements.

FIG. 23 is a diagrammatic illustration correlating the relationship between wave phase quadrants and the corresponding water motion vectors.

FIG. 24 is a diagrammatic illustration of a simple, periodic, deep water wave, indicating its principle features including the relative phase quadrant of the wave and the relationship thereof to its height.

FIG. 25 is a diagrammatic representation of a single array of curved vanes in a subsurface location, indicating with vector arrows its bi-directional water-movement property.

FIG. 26 is a view on the order of FIG. 25, but showing biased curved vanes with uni-directional properties.

FIG. 27 is a view like FIG. 26, illustrating upwardly oriented biased curved vanes with uni-directional properties.

FIG. 28 is a diagrammatic plan view showing various arrangements of the curved vane structure for different purposes.

DESCRIPTION OF THE PREFERRED EMBODIMENT

Figure 29:
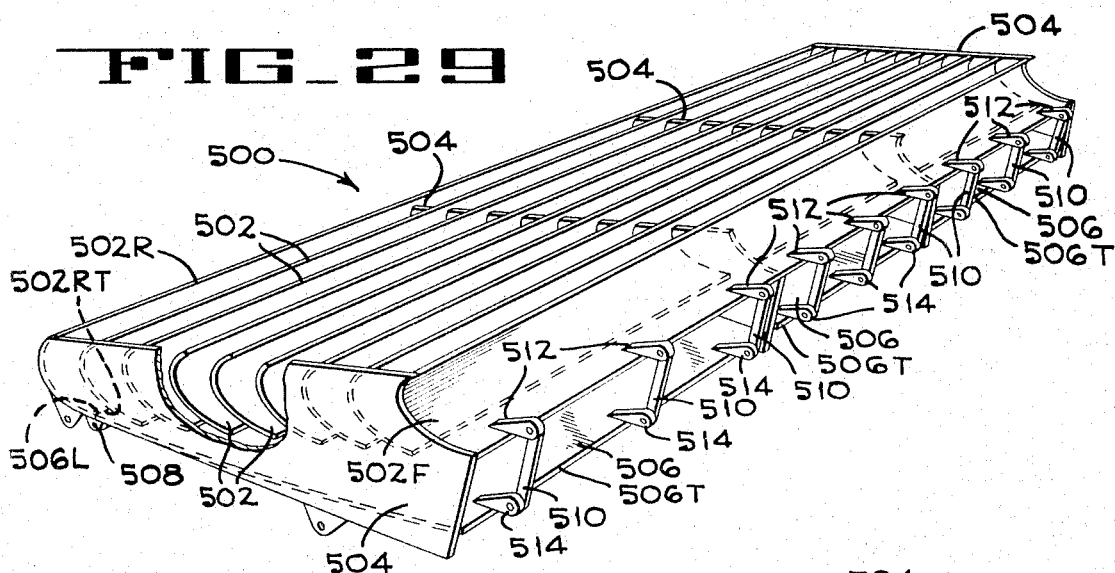
FIG. 29 is a view like FIG. 4, on a reduced scale, illustrating a structure very similar to that of FIG. 4 but having a flexible bottom or duct plate.

FIGS. 1–3 illustrate a fundamental style of curved vane structure 30 embodying the principles of this invention, with vanes 32 arranged in a single array and rigidly secured in spaced parallel position by a plurality of bracing panels 34 to define therebetween primary fluid flow ducts 35 through which water flows in the direction of the arrows. The vanes 32 are curved transversely so that their leading edge portion 32a is directed generally upwardly and towards the incident waves 36 when the structure is properly positioned in a subsurface location (FIG. 2) across the path of the waves, i.e., with the longitudinal dimension of the vanes generally normal to the path, and when in that position the vanes' trailing edge portions 32b are directed downwardly and toward the waves. This curvature and attitude of the vanes facilitates capturing water that has been induced to move in a path 38 (as indicated by the arrows) by the incident wave 36 passing over the structure 30, and subsequently discharging this water from the ducts between each pair of vanes as a return or offshore current 40 moving in a predetermined single direction at the time of leaving the vane trailing edges 32b, as early seen at 48, for example, in FIG. 3.

When the curved vane structure 30 is in subsurface position indicated in FIG. 2, which preferably is located below the mean water line approximately 1 ½ times the incident wave height, passage of the incident waves over it induces a moderate and relatively shallow current 42 counter to the direction of the waves, and this counter-current 42 combines with the primary current 40 to collectively effect a slowing of the waves' speed. When in this position the structure 30 also attenuates the height of incident waves passing over it by a factor of approximately 2 ½, i.e., the height of the attenuated waves is approximately two-fifths that of the undisturbed incident waves, or in other words a 5 foot incident wave is reduced to a 2 foot attenuated wave.

When this curved vane structure 30 is positioned in its surface location shown in FIG. 3, i.e., angularly with its rear portion above and its front portion below the mean water line, it is remarkably effective in attenuating incident waves to produce a lee side with little wave activity. In this location the structure 30 also induces a counter-current 46 that joins the flow 48 from the vanes 32, the two together contituting a moderate return or offshore current 50 that flows counter to the waves and towards the water surface.

The curved vane structure 30 can be secured in its surface location (FIG. 2) by any of the conventional support systems utilized for offshore structures, including not only the illustrated buoyant taut line mooring system comprising buoyancy tanks 52 and taut mooring lines 54, but also by fixed pilings, jack-up legs, spar-type flotation columns with compliant catenary moorings, and the like. For installations at the surface (FIG. 3), fixed pilings 56, floating pylons, or other leg-type supports are very satisfactory.

The curved vane structure 60 illustrated in FIGS. 4–6 comprises a single array of curved vanes 62 shaped like the vanes 32 of the structure 30, but with the outermost rear vane 64 extending forward beneath the vanes 62 to form a solid bottom plate 64a. The vanes 62, 64 likewise are rigidly secured in spaced parallel position by a plurality of bracing panels 65, thereby forming primary ducts 67 similar to ducts 35, and these panels cooperate with the bottom plate 64a to form a secondary manifold-like duct or passageway 68 for conducting the flow of water from the primary ducts 67 toward the front of the structure.

When the curved vane structure 60 is positioned in a subsurface location (FIG. 5) it acts as an excellant braakwater, attenuating incident waves by a factor of 4 ½ to 5. The waves on the lee side of the structure 60 in this subsurface position are very smooth and regular. A weak secondary current 70 is induced as incident waves pass over the subsurface-located structure 60, and this current ultimately joins the primary return or offshore current 72 flowing counter to the waves and upwardly toward the water surface. This primary return current 72 initially comprises the merged series of flows discharging from the several primary ducts 67 between the vanes at their trailing edges and into a secondary manifold-like duct defined between plate 64a and the trailing edges of the vanes.

When the curved vane structure 60 is positioned in a surface location (FIG. 6), it provides both a physical barrier to the incident waves and a strong return current 74. This return current acts as a dynamic barrier to floating contamination, and also as a means of "sweeping" floating comtamination, such as spilled oil, towards a distant collector.

The curved vane structure 60 can be secured in its two functional positions in the same manner as for the structure 30.

The curved vane structure 80 illustrated in FIGS. 7 and 8 is very similar to the structure 60 of FIGS. 4-6, having vanes 82 of the same configuration as vanes 62. The difference between the two structures 60,80 comprises elongated trailing edge portions 84a, 86a of both outermost front and rear curved vanes 84, 86, respectively, and commensurately elongated portions 88a of the bracing panels 88. Adjacent portions 84a, 86a, 88a collectively form an exit conduit 90 from the secondary manifold-like duct that curves downwardly when the structure 80 is positioned in a subsurface location (FIG. 8). This downward attitude of the exit conduit 90 directs the return or offshore current 92 forwardly and downwardly towards the bottom of the body of water in which the structure 80 is installed, producing an offshore bottom current useful in dispersing the effluent 94 from chemical waste or sewage discharge lines.

FIGS. 9 and 10 illustrate a curved vane structure 100 designed to capture wave-induced water movements and redirect them into a shoreward current 102 flowing from the structure downwardly and in the same direction as the incident waves. This structure 100 comprises a plurality of spaced, parallel vanes 104 arranged in a single array and secured in place by an adequate number of bracing panels 106. The vanes 104 are moderately curved in a transverse direction so that when the structure 100 is positioned in its subsurface location (FIG. 10) their leading edge portions 104a are directed both upwardly and towards the incident waves, and their traling edge portions 104b are directed both downwardly and away from the incident waves, with the trailing edge portions defining a smaller angle with respect to the horizontal than that defined by the leading edge portions. The front vane 108 extends rearwardly to form a solid bottom 108a beneath the vanes 104, and the trailing edge portions 108b, 110a of the front and rear vanes 108, 110 are elongated to form with commensurately elongated portions 106a of the panels 106 an exit conduit 112. The bottom 108a and the conduit 112 direct the flow from the vanes downwardly and towards the rear of the structure where it exits as the shoreward current 102.

The curved vane structure 100 is designed for positioning in a subsurface location as illustrated in FIG. 10, and pilings, jack-up legs, buoyant legs, buoyant taut line moorings, or other conventional support systems can be used to secure it in place.

FIGS. 11 and 12 serve to illustrate yet another single array curved vane structure according to the invention, this structure 120 designed for positioning at a surface location as shown in FIG. 12. The vanes 122 are of the same configuration as the vanes 62 of the structure 60 (FIGS. 4-6), and the rear vane 124 also extends beneath the vanes 122 to form a solid bottom 124a just as does the rear vane 64 of the structure 60. However, the trailing edge portions 124b, 126a of the rear and front vanes 124, 126, respectively, are elongated and curved upwardly to form an upward and forward oriented exit conduit 128 with the commensurately elongated portions 130a of the bracing panels 130. Mooring or otherwise securing the structure 120 in its surface position is accomplished by any of the systems previously mentioned for surface positions for the foregoing structures 30 and 60.

The curved vane structure 120 provides both a physical barrier and a strong return or offshore current at the surface of the water. This return current acts as a dynamic barrier to surface contaminants such as spilled oil, and can be used to "sweep" the contaminants towards a remote collecting point.

The curved vane structure 140 illustrated in FIGS. 13-15 is designed especially for performing three critical oil spillage control functions, namely that of physically containing the oil within a designated area, that of dynamically collecting the oil by virtue of the induced surface current which draws the oil towards the structure, and that of pumping the oil to a receiving vessel. The structure 140 is relatively small in size as compared to the previously described structures, and instead of being secured in one location it is mounted on a suitable flotation structure (not shown) such as submerged buoyancy tanks, and is either moored at the site or secured to a towing ship or other vessel, thus being readily transportable to other locations as the need arises.

The structure 140 comprises a plurality of curved primary vanes 142 fixed in parallel spaced relation by end panels 144, 146, a rear vane 148 also fixed to the end panels 144, 146 and extending beneath and past the vanes 142 to form a solid bottom plate 148a, and a ramp 150 connecting with the leading edge 152 of the structure 140 and extending back in spaced relation to the bottom plate 148a towards the vanes 142. The curvature of the vanes 142 and 148 is the same as that of the vanes 62 and 64, respectively, of the curved vane structure 60 (FIGS. 4-6), so that when the structure 140 is in its functional position at the water surface as shown in FIGS. 13 and 14 the attitude of the vanes 142, 148 is the same as that of the vanes 62, 64 when the structure 60 is in its surface position (FIG. 5).

A plurality of deflector vanes 154 are spaced between the bottom plate 148a and the ramp 150 above the leading edge 152 of the structure 140, and these vanes are all curved from an orientation parallel to the panels 144, 146 towards either panel, with all vanes curving in the same direction. The floor plate 148a and the ramp 150 from a collection duct 156 terminating in a discharge duct 158, and drain ports 159a, 159b are provided in the lower end portions of the panels 144, 146. Thus, when the structure 140 is positioned in its functional location at the water surface as illustrated best in FIG. 14, the incident waves ride up the ramp 150 as though it were a steeply sloping beach, enter the primary ducts between the vanes 142, and continue downwardly into the collection duct 156. If the incident waves are of insufficient height for their crest to rise significantly above the upper lip 150a of the ramp 150, or when the structure is used during calm water, the upper portion 150b of the ramp is pivoted upwardly, as by means of a crank system 160, about an axis X through a hinge shaft 162 into the position shown in phantom lines in FIG. 14, thereby permitting the surface portion of the water to flow into the collection duct 156. Accordingly, in either case as water or other fluid flows downwardly in the collection duct 156 it is turned by the vanes 154 in the direction indicated by the arrows 157 to flow through the discharge duct 158 and thence out of the drain port 159b into a flexible pipe 164 connected to a collection vessel.

The structures 140 are intended for arrangement in a series, as shown in FIG. 15, to form a well-defined collection area. In this arrangement their drain ports are interconnected in series by flexible pipes 164 to provide a continuous discharge line connected to a collecting facility 166, such as a barge 168 with a pump 170 and storage tank 172. So that no spilled oil 174, such as might emanate from an offshore well 176, escapes past the structures 140, a flexible curtain 178 is included between each structure to form, in conjunction with the structures, an impervious barrier from one end of the series to the other.

When the structure 140 is in its functional position, the ramp 150 slopes upwardly in a gently curving manner from the water line, to resemble as far as possible a beach with a slope generally of 1 to 10, or steeper. This orientation permits optimum conservation of the wave-fluid momentum that is utilized to perform the aforementioned collecting and pumping functions.

As an alternative to pivoting the upper ramp portion 150a upwardly when very small waves or calm water is encountered, the draft of the structure 140 may be increased to lower it in the water a desired amount to admit the fluid into the collection duct 156. Further, the ramp portion 150a can be raised in manners other than the crank system 160, and can even be constructed so as to be entirely removable.

FIGS. 16 and 17 illustrate a fundamental type of dual array curved vane structure according to this invention. This structure 200 comprises an upper array of curved vanes 202, and a lower array of vanes 204 curved in the same configuration as the vanes 202, but oriented in the device as though they were a mirror image of the vanes 202. The two arrays are secured together in mirror image relationship by bracing panels 206, and the leading edges 208a, 210a of the upper rear vane 208 and the lower rear vane 210, respectively, are fixed to a deflector plate 212. The trailing edge portions 208b, 210b of the rear vanes 208,210 are elongated to extend between the trailing edges of the rearmost two vanes in each array, to create a smooth flow path for water entering the structure along its rearward portion.

The curvature of the vanes 202, 204 is the same as that of the vanes 32 in the structure 30 (FIGS. 1–3), and the structure 200 is designed to be positioned in a subsurface location (FIG. 17) and secured thereto in the same fashion as the structure 30.

When in its subsurface position, this structure 200 produces a strong return or offshore current 212 and a moderate, deep induced current 214. The structure 200 provides wave attenuation of 3 to 3 ½. The waves on the lee side are complex, comprising a diminished fundamental plus several small harmonics. Although the structure 200 performs very satisfactorily as a breakwater, its most valuable function is to generate unusually strong offshore surface currents. Thus, it is highly suitable for use in dispersing heated waste water from steam or atomic power plants and the like.

FIGS. 18 and 19 illustrate one manner in which the dual array structure 200 of FIGS. 16 and 17 can be modified to facilitate operation of propeller-driven power units. In this version 220 of the invention, the structure 200 has been altered by attaching a shroud assembly 222 to the trailing edge portions of the upper and lower front vanes 224, 226. Suiable propeller-driven power units 228, such as electric generators or water pumps for taking advantage of the strong return current 230, are mounted within the ducts 232 formed by the shroud 222. The electric power so produced has a multitude of uses, and the water pumps can be used to supply pressurized fluid flow to maintain small channels open for navigation, or to convey beach replenishment sand from point to point. The structure 220 is positioned in a subsurface location and secured thereto in the same manner as the structure 200.

FIGS. 20 and 21 illustrate another version of dual array curved vane structure according to this invention, this structure 240 designed for use in a subsurface location as depicted in FIG. 21. The vanes 242 in the upper array are curved and oriented in the same manner as the vanes 104 of the single array structure 100 (FIGS. 9 and 10). The bottom array of vanes 244 also are curved the same as the vanes 104, and thereby the same as vanes 242, but they are oriented upwardly and forwardly, whereas the vanes 242 are oriented downwardly and rearwardly. The upper and lower arrays are separated by a central solid baffle plate 246, and all the vanes are secured in position by bracing panels 248.

As seen in FIG. 21, the dual array structure 240 produces two moderate subsurface currents, one labelled 250 counter to the incident waves and the other labelled 252 flowing with these waves.

The primary function of this structure 240 is to attenuate the incident waves, and for this purpose it is secured in the subsurface position by any of the aforementioned mooring systems.

The above described bottom or exit duct plates 64a, 86a, 108a, 124a, 148a, and also the baffle plate 246, perform several critical functions, including (1) channeling the periodic flow from the vane outlets, (2) channeling the wave's orbital movements into the structure's exit duct or passageway area where these movements momentarily enter the vane outlets and partially cancel momentum from the opposing flow during the initial phase of the wave's transit across the structure, and (3) serving as a reflector of the subsurface components of the incident waves. These plates can be either rigid or flexible, depending upon the use for which the invention is intended.

When the plate is flexible, it performs not only the foregoing functions but also at least the additional functions of acting as an energy storage device, and as a phase-shifting element in a series of complex hydrodynamic reactions. As a simplified analogy, the entire structure (vanes and flexible plate) may be understood to act in a manner comparable to that of a multi-element complex impedance in an electrical energy transmission line. In this complex impedance, the flexible plate functions as a major capacitive element wherein energy is stored and a relative phase shift introduced, thus contributing significantly to the overall performance of the entire structure. Processing from this analogy, it may be seen that the appropriate energy storage characteristic (capacitance) of the flexible plate will be related to the initial energy input and the overall complex hydrodynamic reactions generated by the entire structure.

In practice, the flexural characteristics of the flexible plate would be suitably proportioned to the energy and the spectral characteristics (i.e., period, length, and height) of the wave system in which is is designed to operate, as well as the inherent complex impedance characteristics of the particular structure itself, so that optimum overall (broad band) performance may be realized. For example, in the case of wave spectra characterized by short period, relatively small height waves, a fairly flexible plate would be preferred for suitable reactance to the relatively low energy levels. On the other hand, in the presence of long period, large height waves a relatively stiffer plate would be preferred to properly react to the higher energy levels present.

The plate flexes in response to the natural periodic forces generated by the incident waves. The manner in which the energy of the incident wave system is imparted to the flexible plate is substantially as follows. As the crest of the wave approaches the vertical plane coincident with the trailing or exit edge of the plate, the corresponding subsurface orbital water motion is substantially horizontal and moving into the exit duct. In this region the subsurface orbital motion is transformed by the exit duct into a non-orbiting, uni-directional flow proceeding up the duct. Here, two things happen to this flow: (1) a limited portion of the flow courses upwardly as backflow through the vanes, and (2) the remaining portion is converted into dynamic pressure. All of the flow does not proceed through the vanes because of the high resistance of the vanes' outlets to backflow; consequently, the momentum of the remaining portion appears as dynamic pressure. This pressure causes deflection of the plate and a consequent storage of energy and fluid.

The energy stored by the flexible plate is released in substantially the following manner. As the crest of the wave progresses across the vane inlets, a flow of fluid down through the vanes into the exit duct takes place. The flow issuing from the vane outlets induces an outward movement to the fluid within the exit duct and a related reduction of duct pressure, thereby allowing the deflected plate to return to its neutral position. In so doing, the plate imparts its stored energy and fluid to this outflowing stream, thereby increasing the volume and velocity of the stream that emanates from the exit duct.

FIG. 29 illustrates one embodiment of the invention wherein a flexible exit duct plate is employed. This structure 500 is quite similar to the structure 60 of FIGS. 4-6, and comprises a single array of curved vanes 502 rigidly secured in spaced parallel position by a plurality of bracing panels 504. A plurality of flexible exit duct plates 506 are joined at their leading edges 506L, as by hinges 508, to the trailing or exit edge 502RT of the rear vane 502R, and their trailing edges 506T are freely suspended from the front vane 520F, as by links 510 that are pivotally connected to brackets 512 fixed to the vane 502F, and 514 fixed to the plates 506. Thus, the plates 506 are free to flex with respect to the rest of the structure 500 in response to the forces exerted on them by incident waves. In this particular embodiment the resistance to this flexure is inherent in the physical properties of the plate itself.

Figure 30:
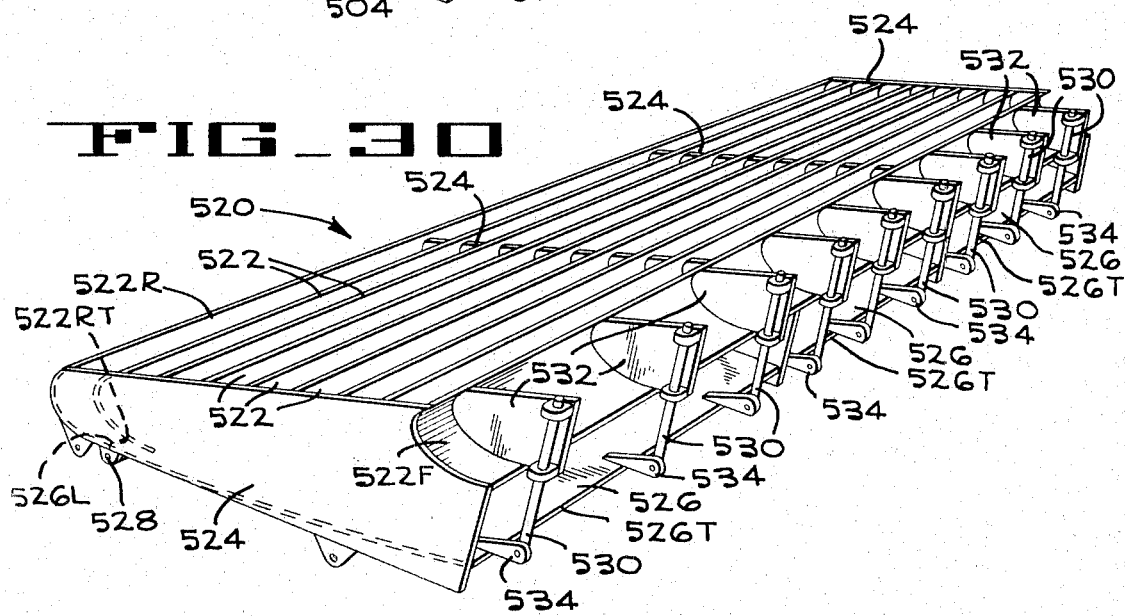
FIG. 30 is a view like FIG. 29, showing a modified version of the suspension system for the flexible duct plate.

Another embodiment of the invention employing a flexible bottom or exit duct plate is illustrated in FIG. 30. This structure 520 is substantially identical to the structure 500 of FIG. 29, having a single array of curved vanes 522 rigidly secured in spaced parallel position by a plurality of bracing panels 524, and a plurality of flexible exit duct plates 526 joined at their leading edges 526L, as by hinges 528, to the trailing edge 522RT of the rear vane 522R. However, in this embodiment the trailing edges 526T of the flexible plates 526 are suspended from the front vane 522F by flexible cantilever beams 530, which beams are rigidly secured to brackets 532 fixed to the vane 522F, and pivotally connected to brackets 534 fixed to the plates 526. The cantilever beams 530 function not only to suspend the flexible plates 526 from the vane array, but also to either augment the flexural resistance of the plates 526 or, where these plates have little or no flexural resistance, to supply the requisite flexural resistance through the beams' resistance to bending. Accordingly, the structure 520 will function in similar fashion to the structure 500.

It should be understood, of course, that the plates 506 and 526 can be integral with the rear vanes 502R, 522R, respectively, instead of separate elements suitably connected thereto by movable means as, for example, are shown in FIGS. 29 and 30. Furthermore, other means than those shown in FIGS. 29 and 30 can be employed to connect the flexible exit duct plates to the vane array, so long as the functions of these plates is retained.

Although the foregoing embodiments of the invention have been illustrated as having uniformly spaced and sized vanes in their arrays, it should be understood that these vanes also can be spaced and sized non-uniformly. When the vanes are uniformly spaced and sized, it has been found that the distribution of potential energy across the array, as represented by the locus of the wave crest as the wave transits the array, is non-uniform. Specifically, the wave height near the point of first encounter is greater than normal, and then this height decreases non-uniformly as the wave progresses across the array. This phenomenon is indicative of high flow resistance characteristics in the portion of the vane array near the point of first encounter. The functional significance of this phenomenon is its indication that energy in excess of the capacity of the passageways between the vanes is impressed upon the array and therefore transmitted beyond it, which in turn degrades the overall performance of the structure.

To reduce or eliminate this problem of excess energy transmission, a non-uniform vane array, i.e., one in which the spacing and size of the vanes are non-uniform, is employed to yield a more uniform potential energy gradient across the inlet face of the array's configuration. Stated another way, a more efficient flow of fluid downwardly between the vanes will result if they are so proportioned in size and spacing with respect to the volume and velocity of flow that the coefficient of resistance to flow is essentially equal amongst all vanes. Thus, since both volume and velocity diminish across the array in the direction of wave propagation, it follows that the passageways between the vanes should diminish in size and spacing in that same direction in order to achieve essentially identical and minimal flow resistance coefficients. This will yield the optimum potential flow capacity for each passageway in the array, and therefore optimum overall performance for the entire structure.

Figure 31:
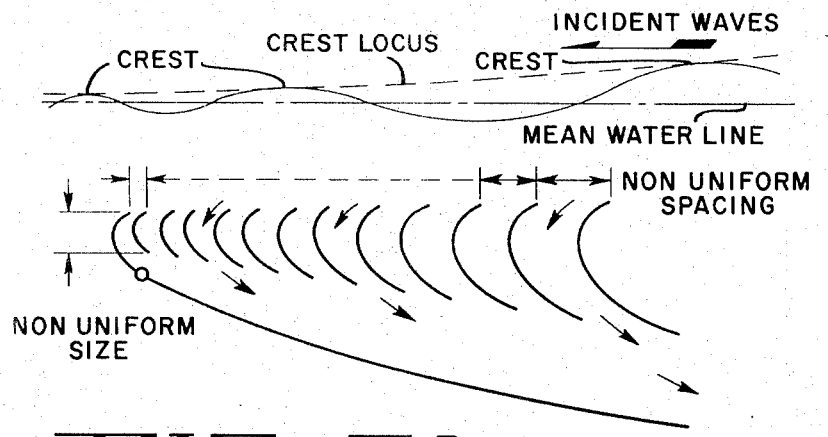
FIG. 31 is a diagrammatic side elevation of a structure similar to that of FIGS. 4–6 and positioned in a subsurface location, illustrating the principle of non-uniform spacing and sizing of the vanes.

As illustrated diagrammatically in FIG. 31, the size of the vanes and their spacing decrease in the direction of wave propagation, as does the wave's crest locus or crestline. The volume of fluid flowing through the passageway between a given pair of vanes will, in this instance, be generally proportional to the wave crest locus above it, since the area between the vanes varies with the crest locus gradient. Therefore, the rate of flow between all vanes will be essentially identical.

Since the passageways between all the vanes are of the same geometric shape and proportion, the resultant flow resistance coefficients of these passageways also will be essentially identical. Accordingly, it should be apparent that the overall performance of the structure of this invention will be enhanced by the utilization of the foregoing non-uniform design principles.

Practical considerations generally indicate that subsurface installations of structures embodying the principles of the present invention are most appropriate for oceanic waters where very large waves are a common occurrence, due to the isolation of these structures from the very high mass transport energies of the surface waves. On the other hand, these same practical considerations generally indicate that surface installations are most appropriate for inland waters where relatively small waves are a common occurence. It should be understood, however, that surface installations can be employed in oceanic, and subsurface installations can be utilized at inland water locations, where desired.

FIG. 28 diagrammatically summarizes the principal oceanic applications previously discussed. One such application comprises a subsurface breakwater 400 arranged to protect a beach area 402 and a harbor entrance 404, this breakwater comprising a plurality of individual curved vane structures suitably joined end-to-end. The number 406 identifies a power plant, sewage treatment plant, or other facility that discharges harmful pollutants into the adjacent body of water through an outfall 408. An installation 410 of several curved vane structures, such as those illustrated in FIGS. 7, 8, 16 and 17, can be used here to produce surface or bottom currents that disperse these pollutant discharges.

The squares 412 represent various types of off-shore activities, such as oil well drilling and production, dredging, mining, salvage operations, cargo lightering, and associated small boat operations. These activities can be protected from harmful effects of prevalent waves by a submerged breakwater installation 414 similar to that at 400. Another installation 416, comprising a plurality of structures illustrated in FIGS. 13 and 14, can be positioned to intercept, contain, and collect surface pollutants such as spilled oil originating from activities at 412.

As illustrated at 418, the structure of this invention also can be used to create an artificial harbor area 420 to protect various types of harbor installations such as piers 422, single point mooring facilities 424, and the many other installations and activities common to harbor areas.

From the preceeding discussion, it will be apparent that similar installations would be suitable for solving comparable problems in inland waters. In addition to the foregoing, erosion of levees and banks along rivers, canals, etc. can be virtually eliminated by employment of structures of this invention. Another significant advantage of these structures is that they may be buoyantly supported so as to rise and fall with large seasonal changes in water level, as in reservoirs, rivers, and the like.

A further advantage of this invention is that the structures embodying its principles are readily fabricated by standard shipyard construction techniques, using conventional marine structural materials and protective finishes. Accordingly, it is apparent that these structures can be manufactured in significantly less time and at significantly less expense than breakwaters and breakwater-like devices currently known.

Still another advantage resulting from this invention is that the general configuration of the structures lends itself to floatation and buoyancy means that are conducive to rapid transport to the installation site by conventional towing equipment and procedures.

THEORY OF OPERATION

A more complete understanding of the performance of the foregoing described structures, and of the results obtained by their use, will develop through a study of FIGS. 22-27 of the drawings and the following discussion. As is well established by ample documentation, including the outstanding work of Robert L. Wiegel entitled "Oceanographical Engineering", published in 1964 by Prentice-Hall, Inc., Englewood Cliffs, New Jersey, U.S.A., water waves and swell, insofar as they affect surface vessels, are generally regarded from their properties that are visible at the air interface, i.e. at the surface of the body of water. Most waves arise from a wind-induced deformation of the water, which of itself is substantially stationary. Stated in another way, the wave travels through the water, but the water itself simply yields locally in a cyclic fashion and returns periodically to its original position, with little or no net transport of fluid either in or against the direction in which the wave is travelling except as may be caused by other forces such as currents, wind, etc.

This subsurface water behavior is called particle orbital motion, and is generally circular in form in depths greater than one-half the wave's length. This is diagrammatically illustrated in FIG. 22 by the circles of column 1, which circles designate the orbits of the water particles undergoing this motion. At the surface, the diameter of these water particle orbits is equal to the wave's height, i.e. the distance H1 (FIG. 22) between the wave's crest and trough lines.

Because of the complex pattern of motion and force exchanges occurring simultaneously along the wave's path within the water, the magnitude of the diameter of the water particles orbital motion decreases exponentially with increasing depth, i.e. by a factor of 50 per cent for each increment of depth equal to one-ninth of the wave's length, as diagrammatically illustrated in FIG. 22 by the orbit-depicting circles of column 1. Thus, is is apparent that the major portion of the motion, velocity and energy induced within the body of water by the passage of a wave is concentrated close to the surface, 50 per cent within a depth of one-ninth of the wave length, 75 per cent within a depth of two-ninths of that length, etc.

In the intermediate zone (FIG. 22) where the water depth becomes less than one-half of the wave's deep water length, both the wave and water motions are significantly affected, and these effects are increased as the depth decreases towards the shallow water zone illustrated at the left side of FIG. 22. However, in the deep water zone the magnitude of wave and fluid motions is substantially unaffected by reactions with the sea bottom, and therefore remains relatively constant over long distances. In the intermediate zone the sea bottom exerts an influence upon the wave's motion, causing increased losses of energy which in turn result in reduced wave speed and length, increased wave height, and corresponding changes in the water's orbital motion. Furthermore, in the intermediate zone the motion of the water particles becomes increasingly elliptical as the depth diminishes, with the long axis of the elipse oriented horizontally. As shown in FIG. 22, as water depth decreases these ellipses become larger, and their relative attenuation as a function of depth is noticeably reduced, which means that in the shallower depths the water motion near the bottom is almost as large as at the surface. This particular natural phenomenon results in high fluid velocities and increased displacements, which when suitably redirected by the curved vane structures of this invention provide a large source or energy that is in part responsible for some of the useful effects that the invention produces. As the wave enters the shallow water region, i.e. water of a depth H2 generally equal to but not greater than the height H3 of the wave itself, the wave becomes inherently unstable and will change from a swell into a breaking wave.

Wave and fluid behavior within the intermediate zone is of special relevance to this invention, since one of the major effects of the structures of this invention is to present waves with a region of reduced depth that causes hydrodynamic reactions that are essentially identical to those which occur in nature at similar depths.

As previously explained, the various embodiments and applications of the turning vane principle of this invention fall into two general categories, namely (1) those which are positioned substantially at the water surface and operate by means of direct reaction with the surface wave and near surface wave-induced fluid movements, and (2) those which are positioned so as to be totally submerged at all times and hence operate by a combination of direct reactions with subsurface fluid movements and indirect reaction with the surface waves. In both of the above general categories, the underlying principle of operation is the same, i.e., wave induced natural fluid movements are acted upon by the turning vanes and caused to move in new and different predetermined directions so as to produce specific hydrodynamic effects. Apart from this functional similarity, there are significant differences between these two categories in terms of the dynamic relationship that occurs between the fluid movements and the vanes. To clarify these differences, the operational basis for each category is outlined below.

In the case of surface applications, the general relationship between wave and fluid movements and the invention is such that there is a strong similarity to the phenomenon which occurs when waves encounter a steeply sloping natural beach. Proceeding from this familiar analogy, it will be seen that an angular array of turning vanes could be positioned with portions extending above and below the water surface, and that this device would intercept the wave and fluid movements and be subject to successive periodic wave and fluid impingements.

Furthermore, if the turning vanes are configured so as to capture and redirect the impinging wave and fluid movements, it will be apparent that the vanes will be subjected to an intermittent series of wave and fluid impulses that act in a unidirectional manner. In this sense it will be readily understood that the hydrodynamic relationships between the vanes and the wave and fluid impulses is substantially similar to that which would occur if the fluid movement were both continuous and unidirectional. In summation, it can be said that these reactions are simple, classic and self-evident.

Turning now to the subsurface case, the reactions which occur are complex and far from being self-evident. In this instance, the entire array of turning vanes is totally immersed within a body of fluid that is undergoing continuous oscillatory periodic movements. As a consequence, the entire array is subjected to continuous multi-directional fluid movements whose direction and magnitude not only vary with time in a periodic manner, but also vary across the width of the unit due to the directional variance of fluid movements corresponding to the change of phase as the wave passes over the unit.

To provide an adequate understanding of these complex phenomena and relationships, attention is directed to FIGS. 23 through 27, and the following discussion.

FIG. 24 depicts a simple periodic deep water wave, and illustrates its principal features. In this figure the wave is shown as moving from right to left, and orbital motion of the water particles are shown moving in their natural counterclockwise direction. The direction and magnitude of water particle orbital motion is indicated by arrows 300, relative to the phase quadrants of the surface wave as indicated by Roman numerals I–IV. Arrows 302 denote the instantaneous motion vectors at the cardinal quadrant boundaries, and also the quadrant mid-points. This motion vector notation is symbolically depicted by FIG. 23.

FIG. 23 presents a simplified correlation of the relationship between wave phase quadrants I–IV and the corresponding water particle motion vectors 302. These vector-phase relationships are depicted in FIGS. 25–27 to indicate the active phase elements in the various configurations represented in those figures.

FIG. 25 illustrates the manner by which the curved vane principle may be applied to physical embodiments so as to selectively intercept the fluid movements in desired quadrants, and selectively direct and intercepted flow into desired new directions.

FIGS. 26 and 27 illustrate curved vane configurations that have the basic property of intercepting and diverting natural orbital fluid movements into a new direction, plus the added feature of an inherent directional (or wave phase) bias which creates a net periodic flow or current that is effectively uni-directional. This net unidirectional property derives from a suitable combination of vane spacings and relative vane inlet angels and configurations at the upper and lower faces, such that the degree of interception and ease of entrance for the moving fluid is facilitated in one direction by large admission areas and entrance angles favorably inclined into the dominant fluid movement direction, and in turn made relatively resistance to counter fluid movements at the opposite face by smaller admission areas and entrance angles so inclined toward the opposing fluid movements as to cause an inherent resistance to admission of those movements. The net result of this converging vane configuration is the highly efficient interception and low resistance diversion of fluid movements in the preferred direction and the consequent generation of a higher velocity flow in a predetermined new direction, the summation of which results in a periodic unidirectional flow or current.

The recurving dotted lines depict the fact that there will be a small transitory counterflow, diminished by the resistive properties of the vaned areas with small angular relationship and reduced passage areas. This transitory counterflow will not truly propagate into the opposing domain, but will be countered and reversed by fluid movements in the following wave phase. Therefore, in view of the foregoing vane properties and in conjunction with the natural phase (or time dependent) wave and wave-induced fluid movements, these configurations cause net (or mean effective) fluid movements that are unidirectional in flow output, although that net flow will pulsate in a periodic fashion.

Thus far, this discussion of the reactive properties of vaned arrays immersed in a body of fluid subjected to periodic oscillatory movements induced by natural wind-induced waves has been purposely restricted to those simple natural phenomena and artificially induced reactions that would be readily apparent to the visual appraisal of those skilled in hydrodynamics. However, the total effectiveness of these vaned structures is only partially due to these more obvious effects. Analysis of scale model testing has shown that other significant hydrodynamic effects of a less visually apparent nature are created by these vaned arrays, and that these account for an appreciable portion of the total effectiveness of these arrays.

Briefly, these less apparent reactions are four in number. The first is an "artificial shoaling" effect wherein, in accordance with observed natural behavior, waves react to the artificial subsurface body of curved vanes in much the same manner as if they suddenly encountered a natural shallow water shoal or reef, i.e. they would be caused to reduce their height, length and speed and tend to decompose into a multiple crest system. The second is an induced phase cancellation of fluid movement momentum, caused by mutual opposition resulting from the meeting of substantially in-phase water movements as redirected through the turning vane array. The third effect is a diversion of mass fluid transport away from its natural destination, thereby depriving the lee side wave system of a major portion of its sustaining momentum and also (in some cases) generating an offshore surface current that reduces the speed and energy of incident waves before they reach the array of turning vanes. The fourth effect is wave reflection, wherein substantial portions of incident wave energies are reflected back toward their offshore source because of the actual or virtual presence of impermeable surfaces which reflect certain vector-phase components of wave induced water motions.

In the light of both theoretical and empirical knowledge and actual model tests, it may be stated with assurance that the previously described curved vane arrays induce a complex and multi-component series of dynamic reactions which, in their entirety, result in the aforementioned beneficial and useful effects.

Although the best mode contemplated for carrying out the present invention has been herein shown and described, it will be apparent that modification and variation may be made without departing from what is regarded to be the subject matter of the invention.

What is claimed is:

1. Apparatus positioned in water in a selected surface or subsurface location across the path of incident waves for attenuating said waves and for controlling and redirecting wave-induced water movements, comprising a. a plurality of elongated, rigid, transversely curved vanes, each vane having a leading edge, a trailing edge vertically spaced from said leading edge, and a curved intermediate portion interconnecting said edges, and b. means for securing said vanes in spaced relation in a generally planar array such that the leading edges of some vanes substantially reside in a first plane, the trailing edges of said some vanes substantially reside in a second plane, and said first and second planes are substantially parallel, i. to define primary ducts between adjacent vanes, said primary ducts altering said wave-induced water movements from their natural path to create a fluid flow that emanates from said ducts as subsurface water currents, ii. with the curvature of adjacent vanes oriented in substantially the same direction, and iii. with the trailing edges of said vanes oriented in substantially the same direction so that said subsurface currents from the ducts flow in substantially the same direction, whereby said apparatus reduces the height, speed, length and period of incident waves, and creates water currents and other useful hydrodynamic effects.

2. An apparatus according to claim 1 wherein said some vanes are uniformly spaced.

3. An apparatus according to claim 1 wherein said some vanes are uniformly sized.

4. An apparatus according to claim 1 wherein said some vanes are uniformly spaced and sized.

5. An apparatus according to claim 1 wherein said some vanes are non-uniformly spaced.

6. An apparatus according to claim 1 wherein said some vanes are non-uniformly sized.

7. An apparatus according to claim 1 wherein said some vanes are non-uniformly spaced and sized.

8. Apparatus according to claim 1 wherein said leading edges are disposed in a direction generally upwardly and toward incident waves.

9. The apparatus of claim 1 wherein said vanes defining said primary ducts converge toward said trailing edges, thereby to accelerate fluid flow through said ducts.

10. An apparatus according to claim 1 wherein an outermost vane in said array is of extended length to define with said remaining vanes a manifold-type secondary duct into which said primary ducts discharge, for constraining and guiding the flow from said primary ducts.

11. Apparatus according to claim 10 wherein both outermost vanes in said array are of extended length to define an exit conduit for controlling the discharge from said secondary duct.

12. An apparatus according to claim 11 wherein the discharge from said secondary duct is directed generally upwardly when the apparatus is installed in an operating attitude.

13. An apparatus according to claim 11 wherein the discharge from said secondary duct is directed generally horizontally when the apparatus is installed in and operating attitude.

14. An apparatus according to claim 11 wherein the discharge from said secondary duct is directed generally downwardly when the apparatus is installed in an operating attitude.

15. An apparatus according to claim 10 including a collection duct positioned to receive and contain the discharge from said secondary duct, thereby isolating said secondary duct discharge from the surrounding water for subsequent conveyance to a collecting facility.

16. An apparatus according to claim 15 wherein the collecting duct includes a plurality of curved deflector vanes for accomplishing a transition in the path of said secondary duct discharge.

17. An apparatus according to claim 16 including at least one fluid conduit in communication with the collecting duct to convey said discharge from said collecting duct to a collecting facility.

18. An apparatus according to claim 15 including a ramp extending towards the terminating proximate the vane array, said ramp positioned to intercept incident waves and wave-induced water movements and direct them into said vane array when the apparatus is oriented in its operating attitude.

19. An apparatus according to claim 18 wherein the ramp includes a movable section for varying the dimension of said ramp as measured in the direction of movement thereover of incident waves and wave-induced water movements.

20. An apparatus according to claim 19 including means to move said movable section.

21. An apparatus according to claim 1 comprising first and second curved vane arrays secured together in spaced, angular, sandwich-like relationship.

22. An apparatus according to claim 21 wherein the discharges from both arrays join to create a combined flow from the apparatus.

23. An apparatus according to claim 22 including a shroud for conveying the discharge from both arrays to a propeller-driven machine.

24. An apparatus according to claim 21 wherein the discharge from the irst array flows from the apparatus in a direction generally opposite to the discharge from the second array, and wherein the arrays are separated by an impervious barrier.

25. An apparatus according to claim 1 including a duct plate attached to an outermost vane, said duct plate extending beneath and in spaced relation to the vane trailing edges to define with said edges an exit duct that confines and redirects the flow from said primary ducts.

26. An apparatus according to claim 25 wherein the duct plate is flexible.

27. An apparatus according to claim 25 wherein the spacing between the duct plate and the trailing edges is variable.

28. A series of end-to-end joined structures positioned in water in a selected surface or subsurface location across the path of incident waves for attenuating water waves and for controlling and utilizing wave-induced water movements, each of said structures comprising a. a plurality of elongated, rigid, transversely curved vanes, each vane having a leading edge, a trailing edge vertically spaced from said leading edge, and a curved intermediate portion interconnecting said edges, and b. means for securing said vanes in spaced relation in a generally planar array such that the leading edges of some vanes lie in a first plane, the trailing edges of said some vanes lie in a second plane, and said first and second planes are substantially parallel, i. to define primary ducts between adjacent vanes, said primary ducts altering said wave-induced water movements from their natural path to create a fluid flow that emanates from said ducts as subsurface water currents, ii. with the curvature of adjacent vanes oriented in substantially the same direction, and iii. with the trailing edges of said vanes oriented in substantially the same direction so that said subsurface currents from the ducts flow in substantially the same direction, thereby to reduce the height, speed, length and period of incident waves, and create water currents and other useful hydrodynamic effects.

29. A method for attenuating water waves, and for controlling and utilizing wave-induced water movements, comprising a. intercepting said waves and wave-induced water movements, b. converting said waves and movements into a subsurface current fluid flow, c. guiding said fluid flow in a plurality of curved paths different from the natural path of said waves and movements, and d. discharging said fluid flow from said curved paths in a predetermined direction at a level vertically spaced from the level at which the waves are intercepted, thereby to attenuate the waves and water movements and provide a reinforced utilizable fluid flow.

30. The method of claim 29 wherein said fluid flow is discharged as a free current at an elevation below that at which said waves and water movements are intercepted.

31. The method of claim 30 wherein said predetermined direction of fluid flow discharge is substantially opposite to that of the intercepted waves at interception.

32. The method of claim 29 wherein said fluid flow paths at discharge are merged into a common path prior to passing as a free current.

33. The method of claim 29 wherein said fluid flow is discharged as a common flow isolated from the surrounding water.

* * * * *

UNITED STATES PATENT OFFICE
CERTIFICATE OF CORRECTION

PATENT NO. : 3,785,159
DATED : January 15, 1974
INVENTOR(S) : DOUGLAS L. HAMMOND It is certified that error appears in the above-identified patent and that said Letters Patent are hereby corrected as shown below:

Column 1, line 64    change "effuent" to --effluent--.

Column 7, line 35    change "traling" to --trailing--.

Column 11, line 49   change "520F" to --502F--.

Column 16, line 39   change "and" (second occurrence) to --said--.

Column 16, line 48   change "angels" to --angles--.

Column 19, line 36   change "irst" to --first--.

Signed and sealed this 24th day of June 1975.

(SEAL)
Attest:

RUTH C. MASON
Attesting Officer

C. MARSHALL DANN
Commissioner of Patents
and Trademarks